(12) United States Patent
Marriott et al.

(10) Patent No.: US 7,909,360 B2
(45) Date of Patent: Mar. 22, 2011

(54) AIRBAG MODULE FOR BUS AND MOTOR COACH

(75) Inventors: Brandon Scott Marriott, Waterford, MI (US); Thomas Wayne Messner, Grand Blanc, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 12/232,915

(22) Filed: Sep. 25, 2008

(65) Prior Publication Data

US 2009/0096192 A1 Apr. 16, 2009

Related U.S. Application Data (60) Provisional application No. 60/960,350, filed on Sep. 26, 2007.

(51) Int. Cl.
*B60R 21/16* (2006.01)
(52) U.S. Cl. ............... 280/730.2; 280/728.2; 280/743.1
(58) Field of Classification Search ............... 280/728.2, 280/728.3, 730.2
See application file for complete search history.

(56) References Cited

U.S. PATENT DOCUMENTS

| | | | | |
|---|---|---|---|---|
| 5,556,128 A * | 9/1996 | Sinnhuber et al. | ......... | 280/730.2 |
| 5,575,497 A * | 11/1996 | Suyama et al. | ............ | 280/730.1 |
| 5,586,782 A * | 12/1996 | Zimmerman et al. | ..... | 280/730.2 |
| 5,636,862 A * | 6/1997 | Cheung et al. | ............ | 280/730.2 |
| 5,944,341 A * | 8/1999 | Kimura et al. | ............ | 280/728.3 |
| 6,099,031 A * | 8/2000 | Bischoff | ........................ | 280/735 |
| 6,155,593 A * | 12/2000 | Kimura et al. | ............. | 280/728.2 |
| 6,286,862 B1 * | 9/2001 | Blank et al. | ..................... | 280/236 |
| 6,378,896 B1 * | 4/2002 | Sakakida et al. | ........... | 280/730.2 |
| 6,450,528 B1 * | 9/2002 | Suezawa et al. | ........... | 280/730.2 |
| 6,528,899 B1 * | 3/2003 | Saito et al. | .................... | 307/10.1 |
| 6,530,597 B1 * | 3/2003 | Nesper et al. | ................. | 280/735 |
| 6,556,903 B2 * | 4/2003 | Chinigo et al. | ................. | 701/29 |
| 7,055,853 B2 * | 6/2006 | Honda et al. | ................. | 280/730.2 |
| 7,209,033 B2 * | 4/2007 | Hofbeck et al. | ........... | 340/457.1 |
| 7,654,562 B2 * | 2/2010 | Klima et al. | ............... | 280/730.2 |
| 2004/0183285 A1 * | 9/2004 | Nishikaji et al. | ........... | 280/730.2 |
| 2007/0296252 A1 * | 12/2007 | Mattes et al. | .............. | 297/216.1 |
| 2008/0296876 A1 * | 12/2008 | Ideue | ......................... | 280/730.2 |

* cited by examiner

*Primary Examiner* — Toan C To
(74) *Attorney, Agent, or Firm* — Foley & Lardner LLP (57) ABSTRACT

A bus includes a plurality of bus seats with a side airbag module mounted to each of the plurality of bus seats. The bus includes a plurality of sensors configured to detect a collision event and a side airbag control module configured to determine which side airbag modules to deploy based on information received from the plurality of sensors. The control module is configured to selectively deploy one or more of the side airbag modules.

15 Claims, 9 Drawing Sheets

AIRBAG MODULE FOR BUS AND MOTOR COACH

CROSS-REFERENCE TO RELATED PATENT APPLICATIONS

This application claims priority to U.S. Provisional Application No. 60/960,350, filed Sep. 26, 2007, which is incorporated herein by reference in its entirety.

BACKGROUND

The present application relates generally to the field of airbags in vehicles. More specifically, the present application relates generally to the field of side airbags in buses, motor-coaches, or other passenger vehicles.

While occupants of a bus have effective protection strategies in place to protect them in case of a front or rear impact collision event, they currently have limited protection during side impact collision events. Occupant protection in a side impact crash event is usually limited to seatbelts and the structure of the bus itself. Occupants seated in rows of seats that are directly in the line of impact during a side impact collision may suffer significant injuries due to the lack of protection available.

Specifically for school buses, there is no current approach of protection that adequately protects occupants during a side impact collision event. The rule of Federal Motor Vehicle Safety Standard (FMVSS) 222 was established for school buses to provide protection to occupants in a frontal or rear impact crash, using compartmentalization. Compartmentalization uses closely spaced and well padded seats to protect the occupants in a collision, but this approach may not help protect the occupant in a side impact collision sufficiently.

Seat-mounted side airbags have not been applied in buses for a variety of reasons. The unique inner geometry of a bus (high bench beats, unique seat spacing, etc.) has created difficulty designing a side airbag that adequately protects the occupants of a bus. The location of the side airbag within the seat of a bus must be carefully chosen to avoid discomfort for the occupants. Specifically for school buses, a side airbag module that complies with FMVSS 222 is needed, while avoiding compromising the protection compartmentalization offers in a front or rear impact collision. Also, the deployment of the side airbag must be capable of protecting full-size occupants, yet satisfying the Insurance Institute for Highway Safety (IIHS) "Technical Working Group" (TWG) out-of-position (OOP) occupant test protocols, which are in place to protect smaller occupants of a bus. Additionally, a tamper resistant design is needed to prevent damage to and preserve the side airbag module.

SUMMARY

One embodiment relates to a seat assembly for a bus or motor-coach. The seat assembly comprises a bus seat with a seat bottom and a seat back, and a side airbag module. The side airbag module includes a side airbag attached to the seat back and is configured to protect an occupant on the bus seat.

Another exemplary embodiment provides a bus or motor-coach with an airbag assembly. The bus or motor-coach comprises a plurality of bus seats with each seat including a seat bottom and a seat back, a side airbag module mounted to each of the plurality of bus seats, a plurality of sensors configured to detect a collision event, and a side airbag control module configured to determine which side airbag modules to deploy based on information received from the plurality of sensors. The control module is configured to selectively deploy one or more of the side airbag modules.

Yet another exemplary embodiment provides an airbag module for a bus seat. The airbag module comprises a side airbag mounted to a bus seat, an inflator for inflating the side airbag, and a cover component comprising an upper cover and lower cover configured to cover the side airbag in an uninflated state. The inflator includes exit orifices that are embedded in the side airbag.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

One disclosed embodiment relates to a side airbag module that deploys during a side impact collision event. The side airbag installed within or mounted to the seat the occupant is residing may be designed to protect part or all of the occupant's body. According to an exemplary embodiment, the side airbag module may be installed in a bus, motor coach, or other suitable vehicle. The side airbag module may be used in conjunction with other occupant safety devices, such as seat-belt retractors or curtain airbags.

Figure 1:
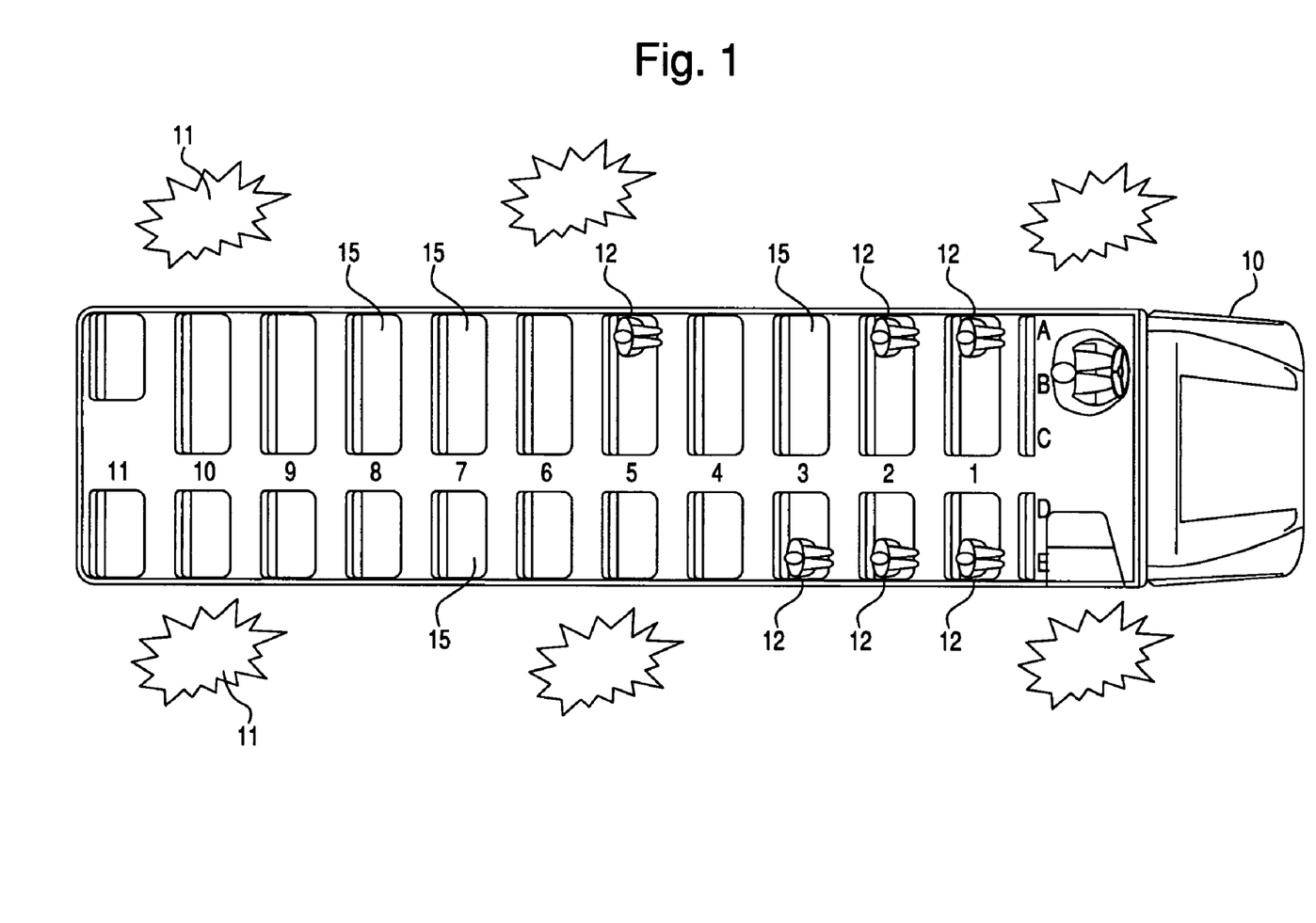
FIG. 1 is a top view of a bus with potential collision zones shown, according to an exemplary embodiment.

FIG. 1 is a top view of a bus 10, according to an exemplary embodiment. In this particular illustration, the bus 10 may be a Type C bus. According to other exemplary embodiments, the bus 10 may be any other kind of school, commercial, motor-coach bus, or other suitable vehicle. Potential side collision zones are illustrated by a plurality of zones 11. A side impact collision may impact all or parts of the zones 11 depending on the type of collision and the colliding object. A side impact collision may impact the lower part of the vehicle, the upper part of the vehicle (including the windows), or both.

A side impact collision may be caused by various events. For example, the bus 10 tipping on its side (e.g. a rollover) is a type of a side impact collision event despite no outside object coming in contact with the bus 10. A side impact collision may also be caused by various objects colliding with the bus 10, whether it be another vehicle, a projectile, etc. The bus 10 includes a plurality of seats 15 arranged in rows, such as shown in FIG. 1. Each seat contains a side airbag module 20. The seats 15 can be bench-type seating, individual "captain" chairs, or any other type of seats.

The side airbag modules 20 located on an outer portion of each seat 15 of the bus 10, according to an exemplary embodiment. The side airbag modules are located inside the bus 10 embedded within or onto a seat 15, according to an exemplary embodiment. According to other exemplary embodiments, the side airbag modules 20 may be located on the inner wall 17 of the bus 10.

Figure 2:
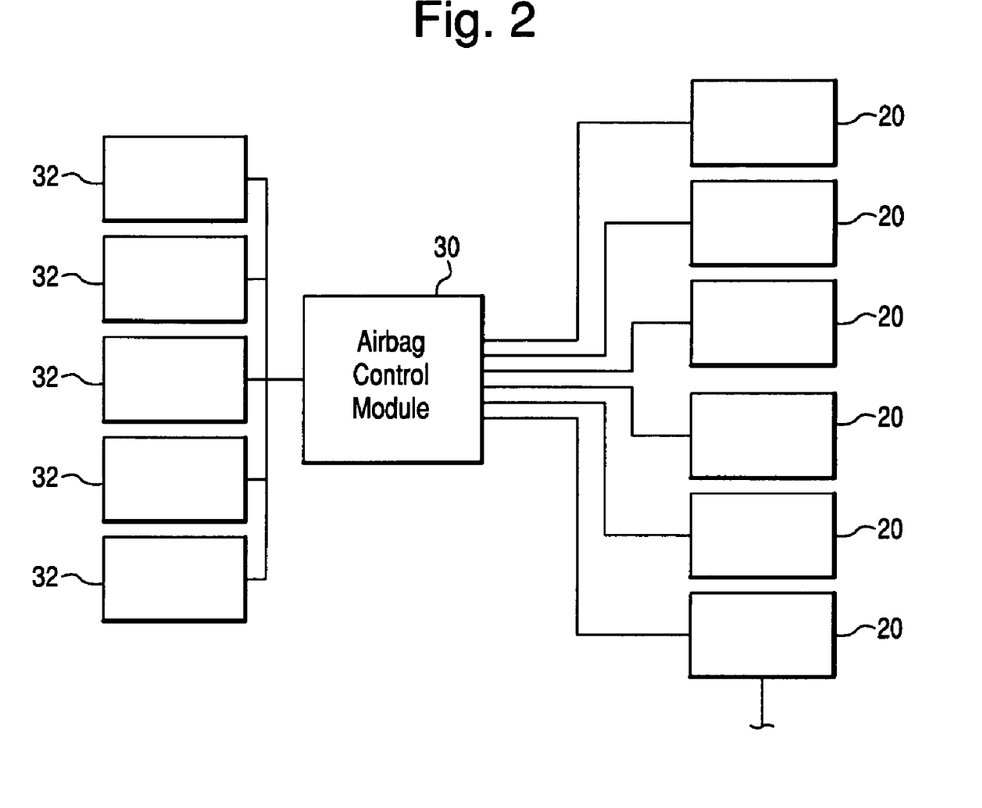
FIG. 2 is a schematic view of an occupant safety system according to an exemplary embodiment.

Each side airbag module 20 may contain a sensor 32, which may be used to detect a side collision event. If a particular sensor 32 detects a side collision event that is deemed to potentially cause injury to the occupant(s) 12 in the respective seat 15, the sensor 32 sends a signal to the control module 30 to determine if one or more side airbags 40 should be deployed. The control module 20 then sends a signal to the appropriate side airbag module(s) 20 to deploy them.

According to an exemplary embodiment, each individual sensor 32 may correspond to a single side airbag module 20. According to other exemplary embodiments, each individual sensor 32 may correspond to multiple side airbag modules 20, or multiple sensors 32 may correspond to a single side airbag module 20. As shown in FIG. 2, the sensors 32 send a signal to the control module 30, which determines which, if any, side airbags 40 are needed and selectively deploys the appropriate side airbag 40. The control module 30 can also control other occupant safety devices, such as seatbelt retractors and other airbags. The control module 30 may determine to deploy all side airbags 40 during a collision event or may selectively deploy side airbags 40 during a collision event. For example, the control module 30 may trigger the deployment of side airbags 40 in specific zones 11 that may be affected by the collision. The method of sensing collision and deploying side airbags 40 may be altered, according to various exemplary embodiments.

Figure 3A:
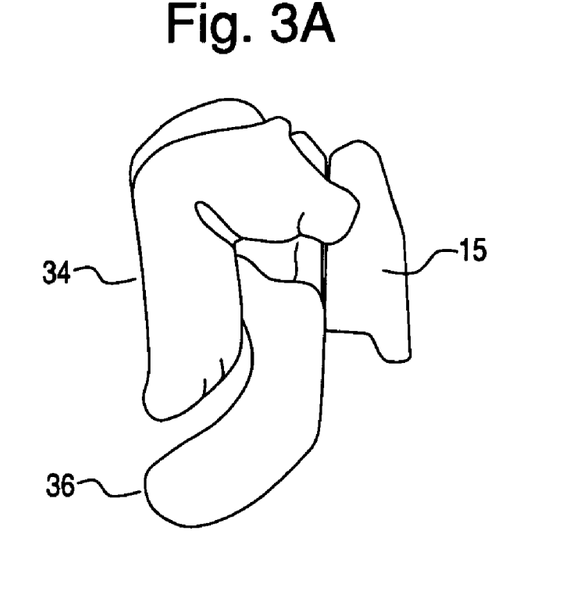
FIG. 3A is an illustration of a deployed side airbag made up of two chambers, according to an exemplary embodiment.

Referring to FIG. 3A, an illustration of a deployed side airbag 40 is shown, according to an exemplary embodiment. The side airbag 40 is deployed from the seat 15. The side airbag 40 may be composed of multiple side airbags or may be a single side airbag. The makeup of the side airbag 40 may be adjusted to account for appropriate levels of protection for various body parts of the occupants 12. The side airbag 40 can be formed from two or more panels that are attached together using stitching, adhesive, or other forms of attachment known in the art. Alternatively, the side airbag 40 may be formed from a single sheet of fabric (or other suitable material). Optionally, seam lines may be made within an outer periphery of the airbag 40; thus forming a plurality of inflation chambers 34, 36.

As illustrated in FIG. 3A, the side airbag 40 is made up of a low pressure chamber 34 and a high pressure chamber 36. The pressure of each chamber 34, 36 may be adjusted to account for various parts of the occupant's 12 body for which the chamber is designed to protect. For example, according to an exemplary embodiment, the low pressure chamber 34 may correspond to the general vicinity of the occupant's 12 thorax and/or shoulder, preventing injury to the upper body area. Likewise, the high pressure chamber 36 may correspond to the general vicinity of the pelvis, which may require added protection. The pressure of the side airbag 40 may be adjusted to account for the occupant types, according to an exemplary embodiment. For example, the pressure of the side airbag 40 may be adjusted if the side airbag module 20 is to be installed in a school bus 10, where the occupants 12 may be younger and may require a different protection setup, versus a motorcoach with adults as the primary occupants 12.

The high pressure chamber 36 may be positioned lower than the lower pressure chamber 24. As shown in FIG. 3A, at least a portion of the high pressure chamber 36 extends lower than the lower pressure chamber 34. The lower pressure chamber 34 extends higher than the high pressure chamber 36. In other embodiments, the chambers may have equal pressure, or a higher pressure chamber by extend above a lower pressure chamber.

Figure 3B:
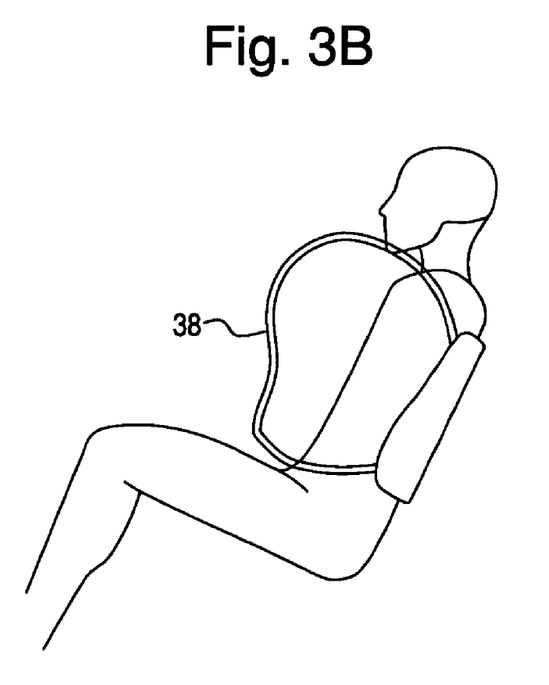
FIG. 3B is an illustration of an area that a side airbag may cover, according to an exemplary embodiment.

Referring to FIG. 3B, an occupant 12 of the seat 15 is shown with an illustration of the area 38 the deployed side airbag 40 may cover, according to an exemplary embodiment. As illustrated, the side airbag 40 (which may be made up of the low pressure chamber 34 and the high pressure chamber 36) covers an area 38 that ranges from approximately the occupant's 12 shoulder and upper chest down to the occupant's 12 hips. The side airbag 40 may be adjusted to cover a greater or lesser area of the occupant's 12 body, according to various exemplary embodiments. For example, the area a side airbag 40 covers may be adjusted due to the presence of a side airbag "curtain" that may protect the upper body of the occupant 12. The bus 10 may include one or more curtain airbags that can be deployed simultaneously with the side airbags 40.

According to an exemplary embodiment, the coverage area 38 of a side airbag 40 can range from approximately 820 to 970 square inches. According to other exemplary embodiments, the coverage area 38 of a side airbag 40 can vary based on other factors. For example, if a side airbag "curtain" system is used to protect the upper body of an occupant 12 is used in conjunction with the side airbag module 20 located on the seat 15, the coverage area 38 of the side airbag 40 located on the seat 15 may be reduced (e.g. approximately from 325 to 450 square inches). The coverage area 38 may be altered by the distance the seat 15 is from a window, the angle or incline of the seat 15, the height of the windows of the bus 10, the distance in between seats 15, seat length, or any other geometric property of a bus 10 or its components.

Figure 4A:
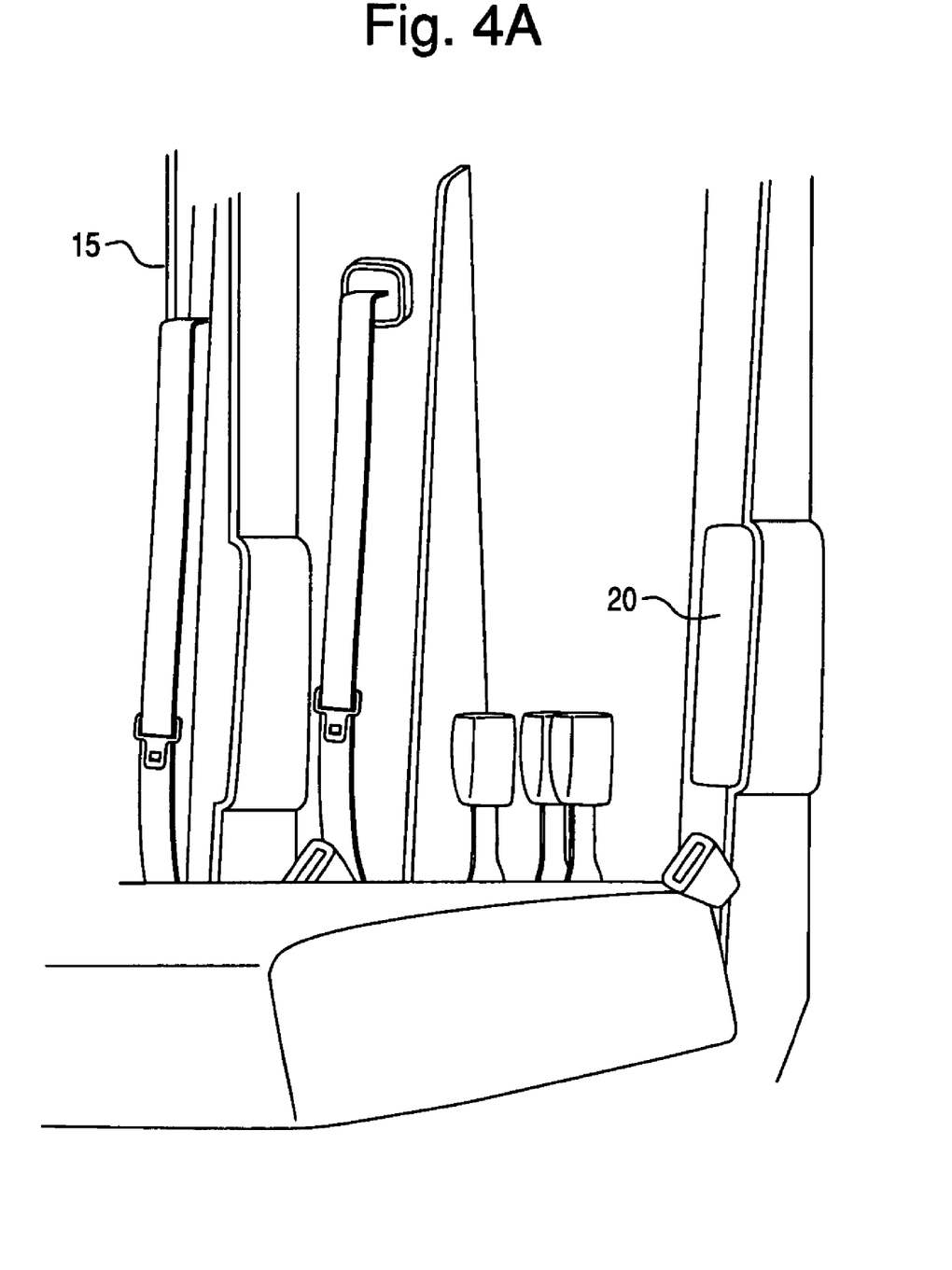
FIG. 4A is an illustration of an installed side airbag coupled to a seat, according to an exemplary embodiment.

Referring to FIG. 4A, an illustration of a seat 15 with a side airbag module 20 is shown, according to an exemplary embodiment. The side airbag module 20 is mounted to the frame of the seat 15. The frame of the seat 15 is shown without a cover or foam to demonstrate the location of the side airbag module 20 in an exemplary embodiment.

Figure 4B:
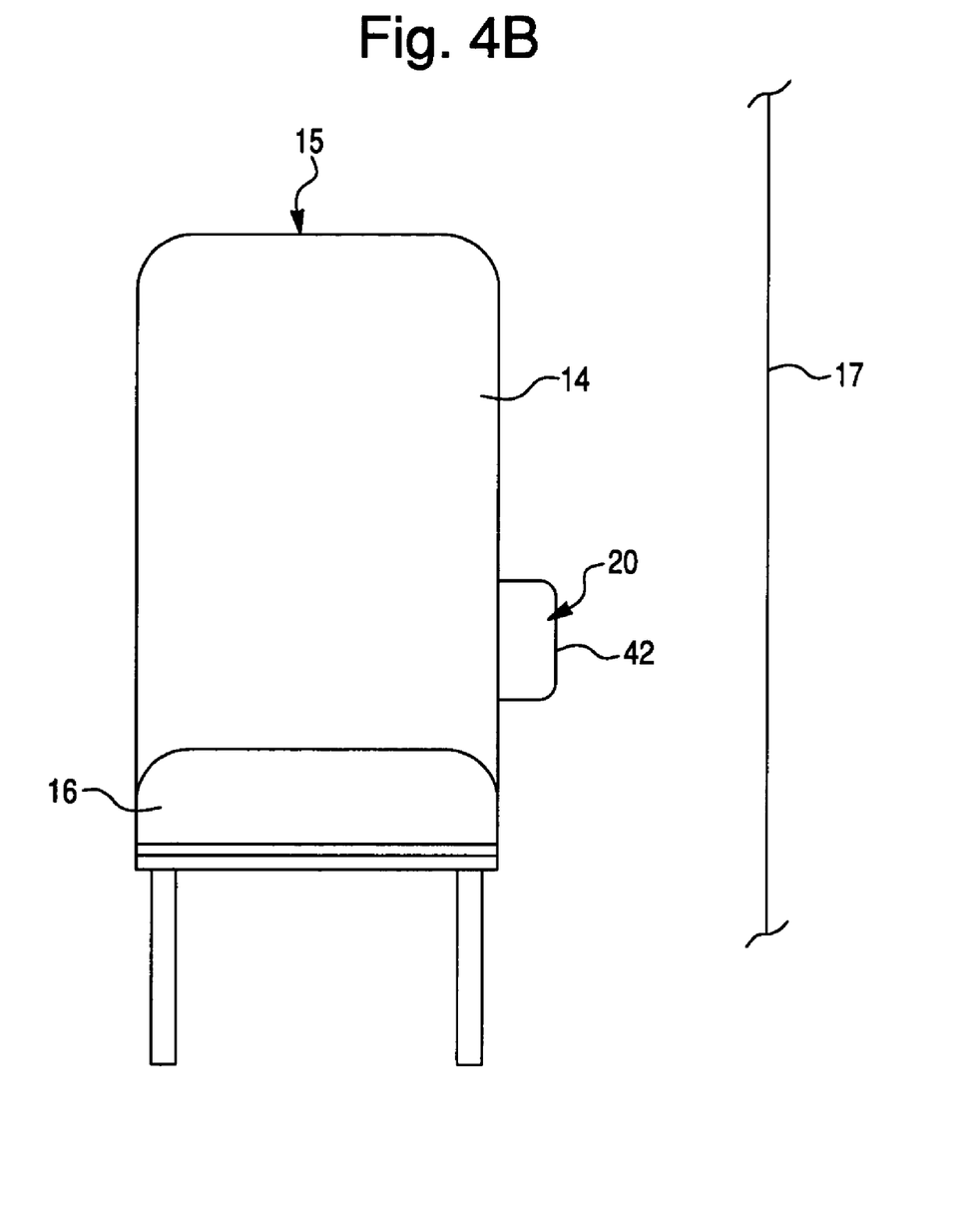
FIG. 4B is a front view of a seat illustrating the side airbag module mounted on the seat, according to an exemplary embodiment.

According to FIG. 4B, the module 20 is attached to an outside of the seat 15 between an outside side edge of the seat back and an interior wall 17 of the bus 10. The side airbag module 20 may have a discrete cover 63, 64 (FIG. 6) or door 42 attached to hide the module 20 from view and/or protect the module 20 from undesired access, according to an exemplary embodiment. The side airbag 40 can deploy through a frangible seam in the cover 63, 64; the cover may be a unitary piece or have multiple pieces 63, 64. Alternatively, the side airbag module 20 may be designed to be tamper resistant and the use of a discrete cover or door may be optional. The side airbag module 20 may be mounted to another area of the seat 15, according to other exemplary embodiments.

Due to the unique dimensions of a bus 10, there is limited area in which to install a side airbag module 20 in order to properly deploy and cover a specified space. The side airbag 40 may be deployed directionally (e.g. at an angle) in order to sufficiently cover a space. The side airbag 40 within the side airbag module 20 may be folded in such a way that minimizes the space the side airbag module 20 takes up.

Figure 5A:
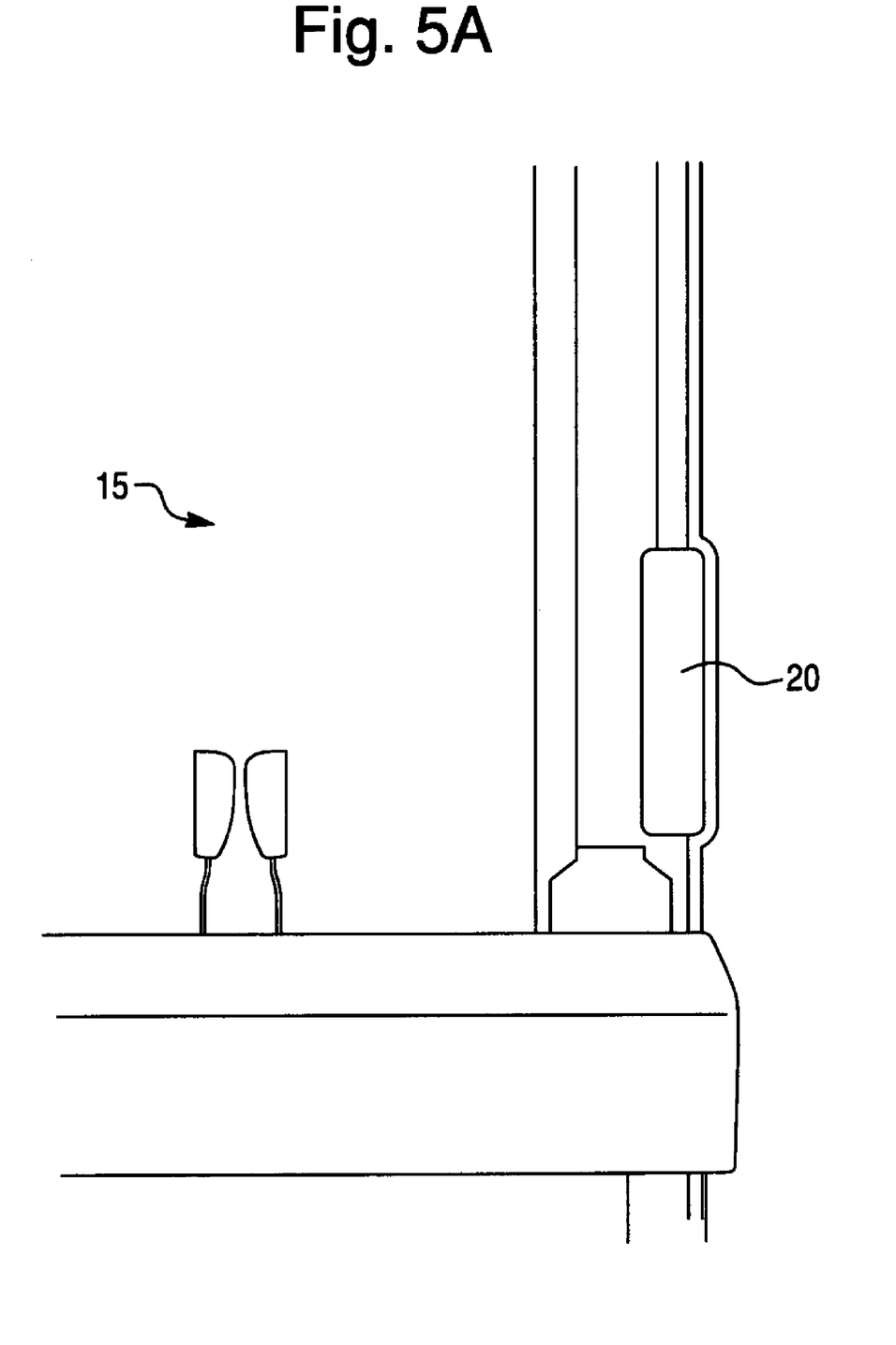
FIG. 5A is an illustration of an installed side airbag contained within a seat, according to an exemplary embodiment.
Figure 5B:
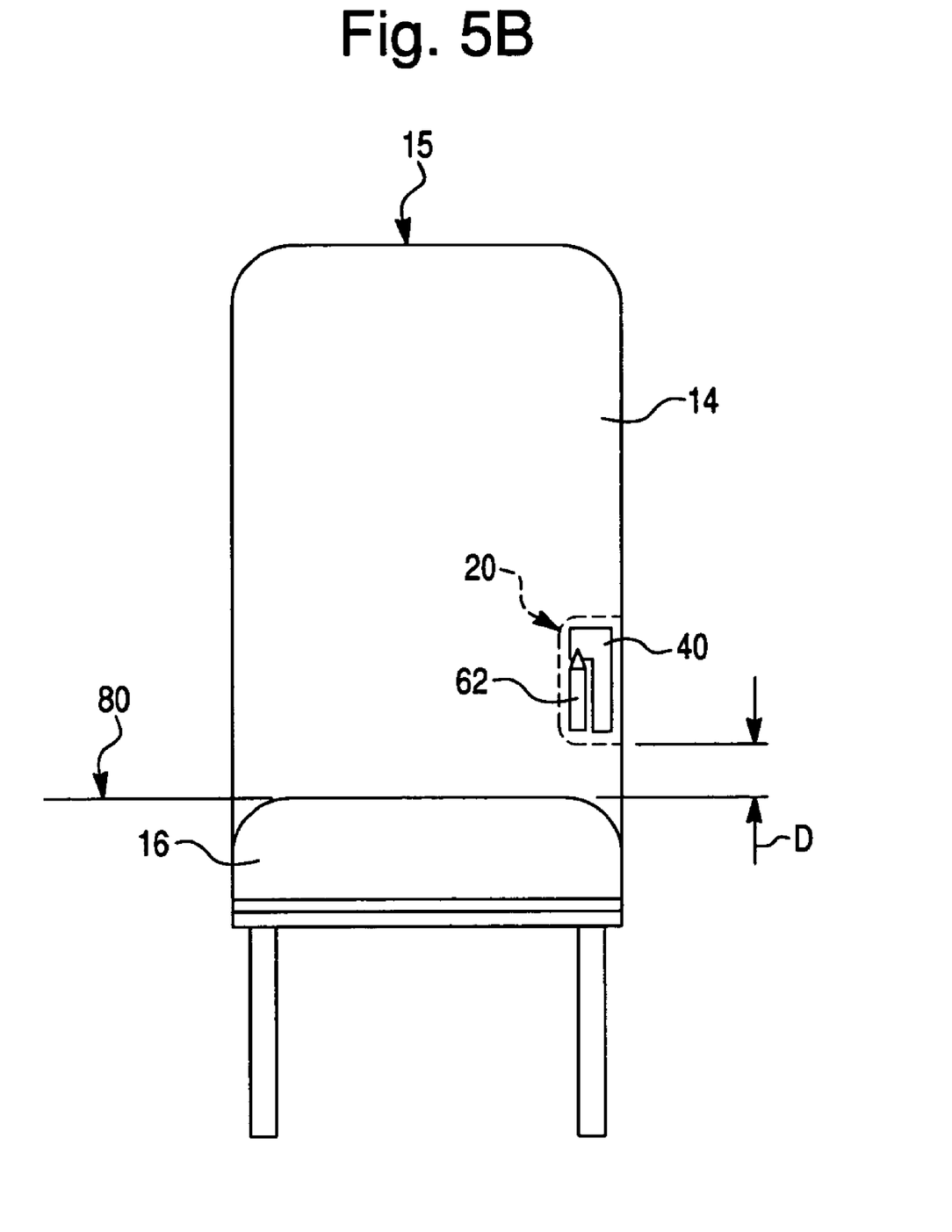
FIG. 5B is a front view of a seat illustrating the side airbag module mounting within the seat, according to an exemplary embodiment.
Figure 7:
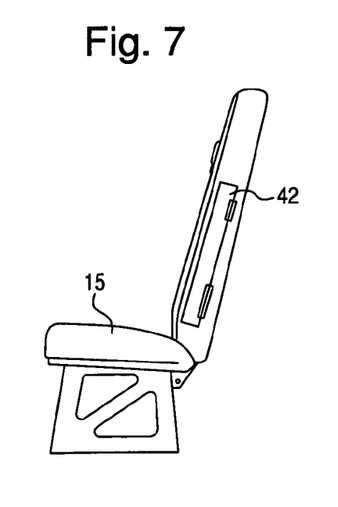
FIG. 7 is a side view of the seat showing a cover for the side airbag module according to an exemplary embodiment.
Figure 8:
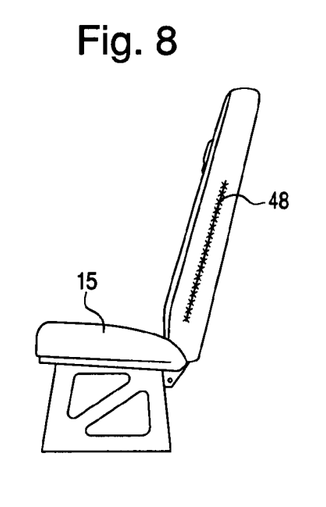
FIG. 8 is a side view of the seat showing a frangible seam according to an exemplary embodiment.

Referring to FIGS. 5A and 5B, a front view of a seat 15 with a side airbag module 20 is shown, according to an exemplary embodiment. The side airbag module 20 may be designed to fit inside of a seat 15. The side airbag 40 can deploy through a frangible seam 48 (FIG. 8) in the seat cover of the seat 15, according to an exemplary embodiment. If the side airbag module 20 is contained within the seat 15, the side airbag 40 is protected from unauthorized access. According to an exemplary embodiment, the seat 15 must be removed in order to access the side airbag module 20. According to another exemplary embodiment, a discrete door 42 or cover may be attached to the side airbag module 20 which becomes detached when the side airbag 40 deploys, such as shown in FIG. 7. As illustrated, the side airbag module 20 may be thin enough to fit inside the seat 15 or in another crevice around the seat 15.

The side airbag module 20 may be located such that the side airbag module 20 does not naturally come into contact with an occupant 12 occupying seat 15. The side airbag module 20 may be placed such that the occupant 12 of seat 15 may comfortably sit in the seat 15, yet provide sufficient to the occupant 12 protection when deployed. According to various embodiments, the airbag cushion 40 design, the fold pattern of the airbag 40 when stowed, the seat mounting scheme, module 20 construction, and the size of the inflator 62 may all be chosen as appropriate in order to limit potential discomfort for the occupant 12 of the vehicle 10. The door 42 may be plastic or another material that does not cause discomfort for the occupant 12 of the vehicle should the occupant 12 come in contact with the side airbag module 20.

Figure 6:
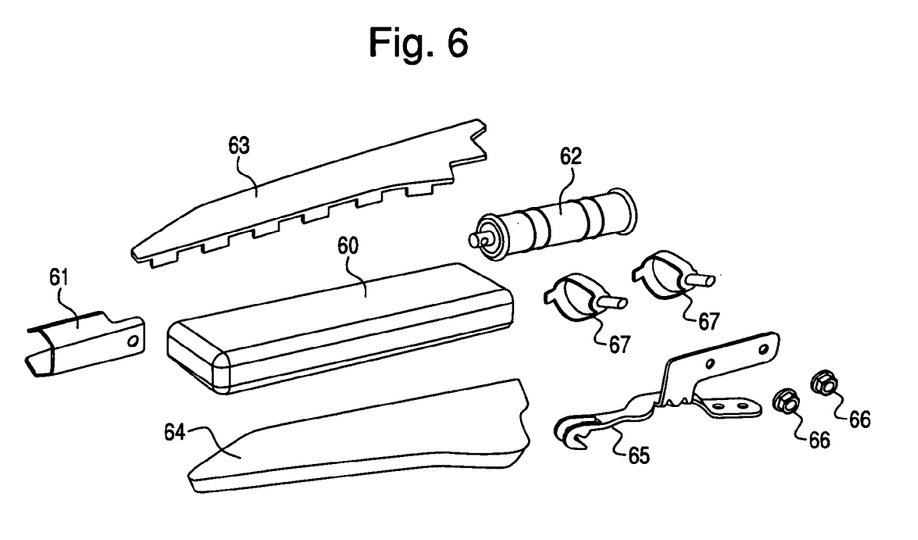
FIG. 6 is an exploded view of the assembly of a side airbag module, according to an exemplary embodiment.

FIG. 6 is an exploded view of a side airbag module 20, according to an exemplary embodiment. The side airbag 40 may be protected and attached to the seat 15 of a bus 10 in various ways (see FIGS. 4A-5B). The side airbag module 20 can include the side airbag 40, an inflator 62, a diffuser 61, clamps 67, an upper cover 63, lower cover 64, brackets 65, and fasteners 66.

The inflator 62 is coupled to the side airbag 40 and is responsible for inflating the side airbag 40 when the command to deploy the side airbag 40 is issued from the control module 30. Side impact collision events may have high intrusion rates. Therefore, the inflator 62 may be designed to rapidly inflate the side airbag 40 in a short period of time to ensure a timely deployment. Buses 10 also require greater "coverage zones" by an individual airbag 40 in order to cover a greater amount of space. The inflator 62 may be designed to have an appropriate size-to-performance ratio to inflate the side airbag 40 to the proper pressure and size in an allotted time without compromising the side airbag module 20 design or occupant safety.

Figure 10:
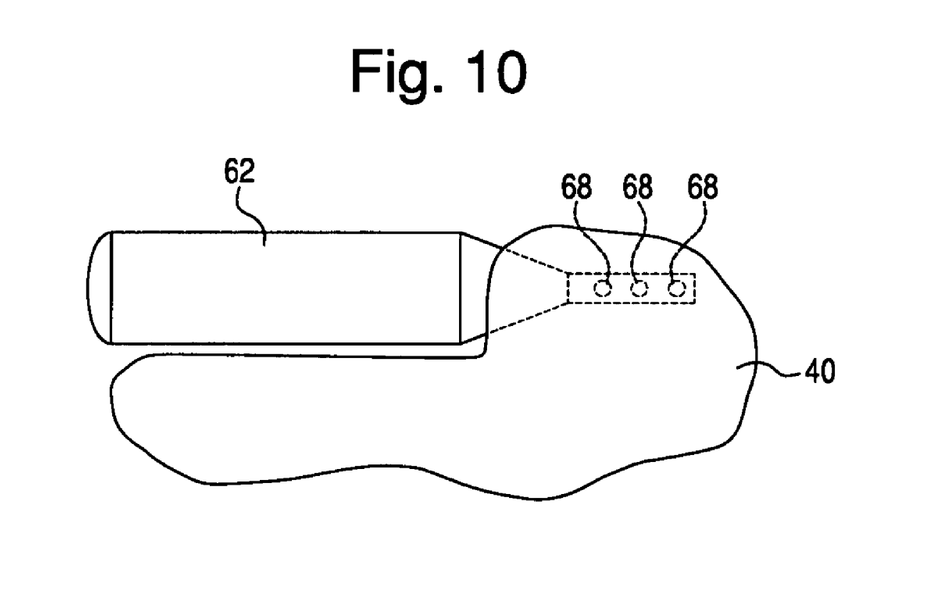
FIG. 10 is an illustration of an inflator connected to a side airbag, according to an exemplary embodiment.

The inflator 62 may also be designed to keep the pressure of the side airbag 40 or airbags 40 at a proper level for an extended period of time. For example, if the bus 10 has a rollover event, the side airbags 40 may need to stay inflated for a significant amount of time. The inflator 62 may be designed to continuously inflate the airbags 40 as needed. The inflator 62 exit orifices 68 may be embedded into the side airbag 40 itself, so that efficiency concerns with the inflator 62 are mitigated and the integrity of the side airbag 40 is preserved. For example, FIG. 10 illustrates exemplary exit orifices 68 of the inflator 62 positioned within the side airbag 40. It will be recognized that the inflator 62, exit orifices 68, and side airbag 40 may have any other suitable configuration and placement and FIG. 10 is included for exemplary purposes only.

The diffuser 61 may be coupled to the side airbag 40 and may be responsible for distributing the air in the side airbag 40 such that the distribution of air is balanced. This process may be adjusted to produce various air pressures in various locations within an airbag (see FIG. 3A).

The upper cover 63 and the lower cover 64 may be secured around the perimeter of the side airbag 40, according to an exemplary embodiment. If the side airbag 40 is installed on the outside of the seat 15, the use of the covers 63 and 64 may be highly useful to prevent undesired access to the module 20. The covers 63 and 64 may be injection-molded, according to an exemplary embodiment. The covers 63 and 64 may fit around the side airbag 40 and cover the side airbag 40 completely, which may prevent tampering and protect the side airbag 40 from other potential obstructions. The upper cover 63 and the lower cover 64 may "lock" into place against each other using latches, holes, or other fastening materials. The covers 63, 64 separate upon inflation of the airbag 40. Alternatively, the cover may include a frangible tear seam through which the side airbag 40 deploys. The covers 63 and 64 may also be fastened to a sturdy material within the seat 15, according to various exemplary embodiments.

The use of the upper cover 63 and the lower cover 64 may be optional. For example, if the side airbag is installed inside of the seat, the use of the covers 63 and 64 may be space-consuming.

The side airbag module 20 may be secured to the seat 15 in various ways. According to one exemplary embodiment, brackets 65 may be used to hold the side airbag module 20 in place during both a stowed state and a deployed state. The bracket 65 may latch on to the covers 63 and 64 if the covers are included in the side airbag module 20. The bracket 65 may also be coupled to the side airbag 40 directly, securing the side airbag 40 during deployment. The bracket 65 may be attached to the seat 15 in a variety of ways. For example, two nuts 66 may be used to hold the bracket 65 in place against a sturdy material inside the seat 15, such as the frame.

Clamps 67 may also be used to help secure the side airbag module 20. The clamps 67 may be secured to either the side airbag 40 or the inflator 62, according to an exemplary embodiment. The clamps 67 may be designed in a round fashion to fit around a cylindrical inflator 62. The clamps 67 may be fastened to the seat 15 in a variety of ways. For example, nuts 66, screws, or other fasteners may be used to fasten the clamps 67 to a sturdy material within the seat 15. The methods in which the side airbag module 20 may be fastened within the seat 15 of a bus 10 may vary according to various exemplary embodiments, and the method of securing the side airbag module 20 may not be limited to the use of brackets 65 or clamps 67.

Figure 9:
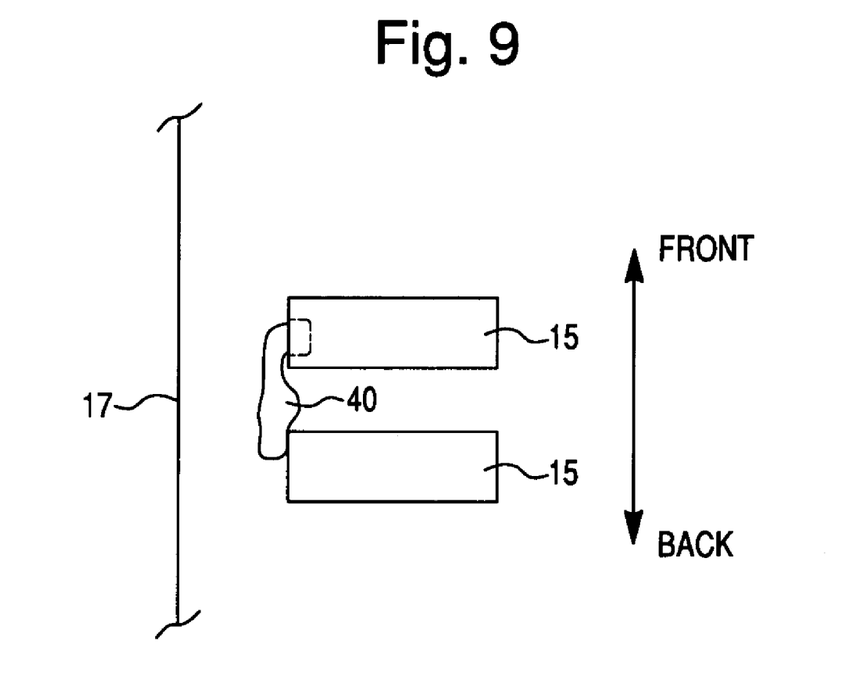
FIG. 9 is an illustration of a side airbag of a first seat deploying rearwards toward a second seat, according to an exemplary embodiment.

As shown in FIG. 9, the side airbag module 20 may be located on the back of a first seat 15, according to an exemplary embodiment, and may deploy to protect the occupants 12 in a second seat 15 behind the first seat 15. In another exemplary embodiment, the side airbag 40 may deploy forward to protect the occupants 12 in the seat where the side airbag module 20 is installed.

The side airbag module 20 may be designed to comply with the out-of-position ("OOP") child testing protocols developed by the IIHS-sponsored TWG. The protocols relate to providing minimum risk to smaller seat occupants in a vehicle. Additionally, the design of the side airbag module 20 may be altered for modules 20 that are to be installed in school buses.

The various components of the side airbag module 20 may be packed strategically to avoid occupant discomfort. Rigid or semi-rigid components (e.g. the plastic covers, the metal inflator, etc.) of the side airbag module 20 may be positioned a distance D between approximately zero millimeters and 500 millimeters about the seat bight line 80, which can prevent the occupant 12 from feeling discomfort in the head or shoulder area, according to an exemplary embodiment. As shown in FIG. 5B, the seat bight line 80 is the intersection of the seat back 14 and seat bottom 16 of the seat 15. The placement of the side airbag module 20 within the seat 15 may be varied using knowledge about the usual size of the occupant 12 of the seat 15.

It is important to note that the construction and arrangement of the side airbag module as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. A seat assembly for a bus or motor-coach, comprising:
   a bus seat with a seat bottom and a seat back; and
   a side airbag module with a side airbag attached to the seat back configured to protect an occupant on the bus seat, wherein the side airbag comprises a plurality of chambers, wherein one of the plurality of chambers is a higher pressure chamber than a second of the plurality of chambers, and wherein the higher pressure chamber is configured to inflate to a position lower than the second of the plurality of chambers when the airbag is inflated.

2. The seat assembly of claim 1, wherein the side airbag is mounted inside the seat back.

3. The seat assembly of claim 2, wherein the side airbag is configured to deploy through a frangible seam in the seat back.

4. The seat assembly of claim 2, wherein the side airbag is mounted to a frame of the seat, wherein the side airbag includes a cover with a frangible tear seam, and wherein the side airbag deploys through the frangible tear seam in the cover.

5. The seat assembly of claim 1, wherein the side airbag is mounted to the seat outside of the seat back between an outside side edge of the seat back and an interior wall of the bus.

6. The seat assembly of claim 5, wherein the side airbag module is covered by a cover.

7. The seat assembly of claim 1, wherein the side airbag comprises a coverage area of approximately 820 to 970 square inches.

8. The seat assembly of claim 1, wherein rigid or semi-rigid module components are positioned in the bus seat at a location between 0 and 500 mm above a seat bight line at an intersection of the seat back and seat bottom.

9. A bus or motor-coach with an airbag assembly, comprising:
   a plurality of bus seats, each seat including a seat bottom and a seat back;
   a side airbag module mounted to each of the plurality of bus seats;
   a plurality of sensors configured to detect a collision event; and
   a side airbag control module configured to determine which side airbag modules to deploy based on information received from the plurality of sensors, the control module configured to selectively deploy one or more of the side airbag modules.

10. The bus or motor-coach of claim 9, further comprising a curtain airbag module configured to deploy simultaneously with one or more side airbag modules.

11. The bus or motor-coach of claim 9, wherein one side airbag module mounted in a first bus seat of the plurality of bus seats is configured to deploy rearward of the first bus seat toward occupants in a second bus seat of the plurality of bus seats positioned behind the first bus seat.

12. An airbag module for a bus seat, comprising:
    a side airbag mounted to a bus seat;
    an inflator for inflating the side airbag, wherein exit orifices of the inflator are embedded in the side airbag; and
    a cover component comprising an upper cover and lower cover configured to cover the side airbag in an uninflated state,
    wherein the side airbag includes a high pressure chamber and a low pressure chamber.

13. The airbag module of claim 12, wherein the side airbag has a coverage area of approximately 820 to 970 square inches.

14. The airbag module of claim 12, further comprising at least one clamp to secure the side airbag module to a bus seat.

15. The airbag module of claim 12, wherein the high pressure chamber is configured to inflate to a position lower than the low pressure chamber when the airbag is inflated.

* * * * *